US012150440B2

(12) United States Patent
Miller

(10) Patent No.: US 12,150,440 B2
(45) Date of Patent: Nov. 26, 2024

(54) AUTOMATED SNARE ASSEMBLY

(71) Applicant: Phillip Miller, North Adams, MI (US)

(72) Inventor: Phillip Miller, North Adams, MI (US)

( * ) Notice: Subject to any disclaimer, the term of this patent is extended or adjusted under 35 U.S.C. 154(b) by 231 days.

(21) Appl. No.: 17/968,414

(22) Filed: Oct. 18, 2022

(65) Prior Publication Data
US 2024/0122173 A1 Apr. 18, 2024

(51) Int. Cl.
*A01M 23/34* (2006.01)
*H04N 7/18* (2006.01)
*H04N 23/56* (2023.01)
*H04N 23/57* (2023.01)
*H04N 23/661* (2023.01)

(52) U.S. Cl.
CPC ........... *A01M 23/34* (2013.01); *H04N 7/183* (2013.01); *H04N 7/188* (2013.01); *H04N 23/56* (2023.01); *H04N 23/57* (2023.01); *H04N 23/661* (2023.01)

(58) Field of Classification Search
CPC .................................................... A01M 23/34
See application file for complete search history.

(56) References Cited

U.S. PATENT DOCUMENTS

| | | | | |
|---|---|---|---|---|
| 1,342,425 A * | 6/1920 | Crago | ................... | A01M 23/34 43/87 |
| 2,224,474 A * | 12/1940 | Draggoo | ............... | A01M 23/34 43/87 |
| 2,700,844 A * | 2/1955 | Pastuck | ................. | A01M 23/34 43/87 |
| 2,894,352 A * | 7/1959 | McDonald | ............ | A01M 23/34 43/87 |
| 3,060,623 A * | 10/1962 | Aldrich | ................. | A01M 23/34 43/87 |
| 3,068,608 A * | 12/1962 | Counts | .................. | A01M 23/34 43/87 |
| 4,179,837 A * | 12/1979 | Gummeringer | ....... | A01M 23/34 43/87 |
| 4,601,128 A * | 7/1986 | Danison | ................ | A01M 23/34 43/87 |
| 4,739,578 A * | 4/1988 | Pitchford, Jr. | ........ | A01M 23/34 43/87 |
| 4,790,102 A * | 12/1988 | McPherson | ........... | A01M 23/34 43/87 |
| 4,827,662 A * | 5/1989 | Dahlman | .............. | A01M 23/34 43/87 |
| 5,062,237 A * | 11/1991 | Kitagawa | .............. | A01M 23/34 43/87 |
| 6,684,562 B1 * | 2/2004 | Schade | ................ | A01K 15/003 43/87 |

(Continued)

FOREIGN PATENT DOCUMENTS

WO    WO2017116985    7/2017

*Primary Examiner* — Jessica B Wong

(57) ABSTRACT

An automated snare assembly for remotely operating an animal snare includes a monitoring unit that is mountable to a tree. Additionally, the monitoring unit is in wireless communication with a personal electronic device. The monitoring unit includes a camera for providing imagery of a selected area proximate the tree. A snare unit is positionable in an area for snaring an animal and the snare unit is positionable in a ready condition to snare the animal. The snare unit is in wireless communication with the personal electronic device and the snare unit is actuatable into a releasing condition by the personal electronic device to release the animal that is snared.

17 Claims, 9 Drawing Sheets

(56) References Cited

U.S. PATENT DOCUMENTS

| | | | |
|---|---|---|---|
| D628,614 S | 12/2010 | Barley | |
| 9,743,657 B2 | 8/2017 | Rich | |
| 10,285,029 B2 | 4/2019 | Hobbs | |
| 2013/0342344 A1 | 12/2013 | Kramer | |
| 2014/0202065 A1* | 7/2014 | DeMers | A01M 23/34 43/87 |
| 2015/0296766 A1* | 10/2015 | Gaskamp | A01M 23/20 43/61 |
| 2016/0277688 A1 | 9/2016 | Gaskamp | |
| 2018/0271083 A1 | 9/2018 | Crezee | |
| 2019/0150426 A1 | 5/2019 | Priefert | |
| 2019/0166823 A1 | 6/2019 | Dick | |
| 2020/0267515 A1* | 8/2020 | Stapleford | H04W 4/14 |
| 2023/0304836 A1* | 9/2023 | Greenboim | G01F 1/20 |
| 2024/0114890 A1* | 4/2024 | Vickery | G06V 20/52 |

\* cited by examiner

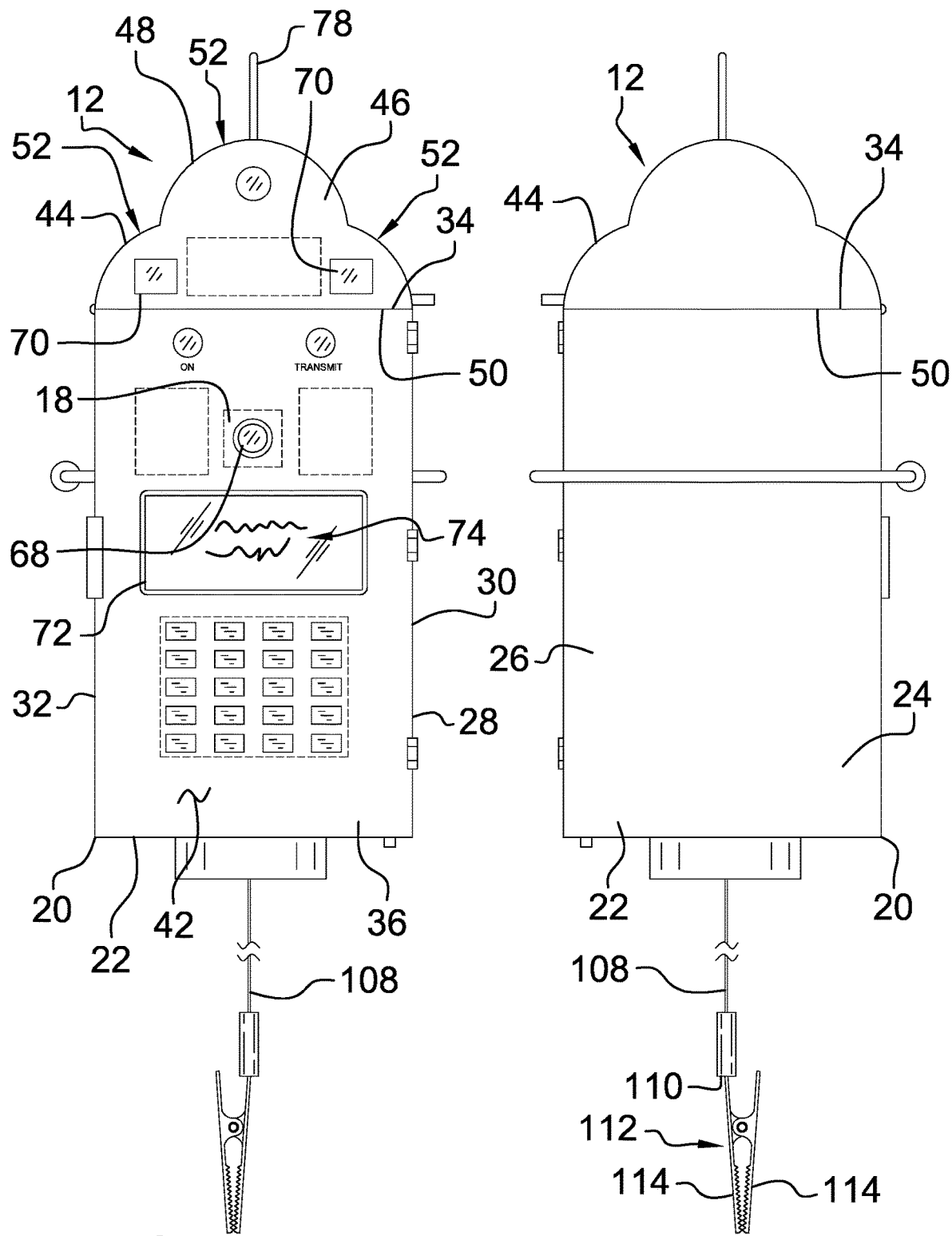

AUTOMATED SNARE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to snare devices and more particularly pertains to a new snare device for remotely operating an animal snare. The device includes a monitoring unit that is positionable on a tree. The monitoring unit includes a camera and the monitoring unit is in wireless communication with a personal electronic device. The device includes a snare unit that is positionable on the ground the snare an animal and the snare unit is in wireless communication with the personal electronic device. The monitoring unit alerts the personal electronic device when an animal is snared and the personal electronic device can remotely actuate the snare unit to release the animal that is snared.

(2) Description of Related Art Including Information Disclosed Under 37 CFR 1.97 and 1.98

The prior art relates to snare devices including a remote trap notification system which includes a plurality of rodent traps that are each in wireless communication with a base station which is in communication with a cloud server. The prior art discloses an animal camera which includes a semi-cylindrical housing and a camera mounted to an end of the semi-cylindrical housing. The prior art discloses a variety of wireless trap monitoring systems that each includes a mechanical trap that is in wireless communication with a receiver. The prior art discloses a variety of trail cameras that are in wireless communication with a communication network. The prior art discloses a variety of wild game traps that includes spring loaded mechanisms or cages.

BRIEF SUMMARY OF THE INVENTION

An embodiment of the disclosure meets the needs presented above by generally comprising a monitoring unit that is mountable to a tree. Additionally, the monitoring unit is in wireless communication with a personal electronic device. The monitoring unit includes a camera for providing imagery of a selected area proximate the tree. A snare unit is positionable in an area for snaring an animal and the snare unit is positionable in a ready condition to snare the animal. The snare unit is in wireless communication with the personal electronic device and the snare unit is actuatable into a releasing condition by the personal electronic device to release the animal that is snared.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of a monitoring unit of an embodiment of the disclosure.

FIG. 3 is a back view of a monitoring unit of an embodiment of the disclosure.

DETAILED DESCRIPTION OF THE INVENTION

Figure 1:
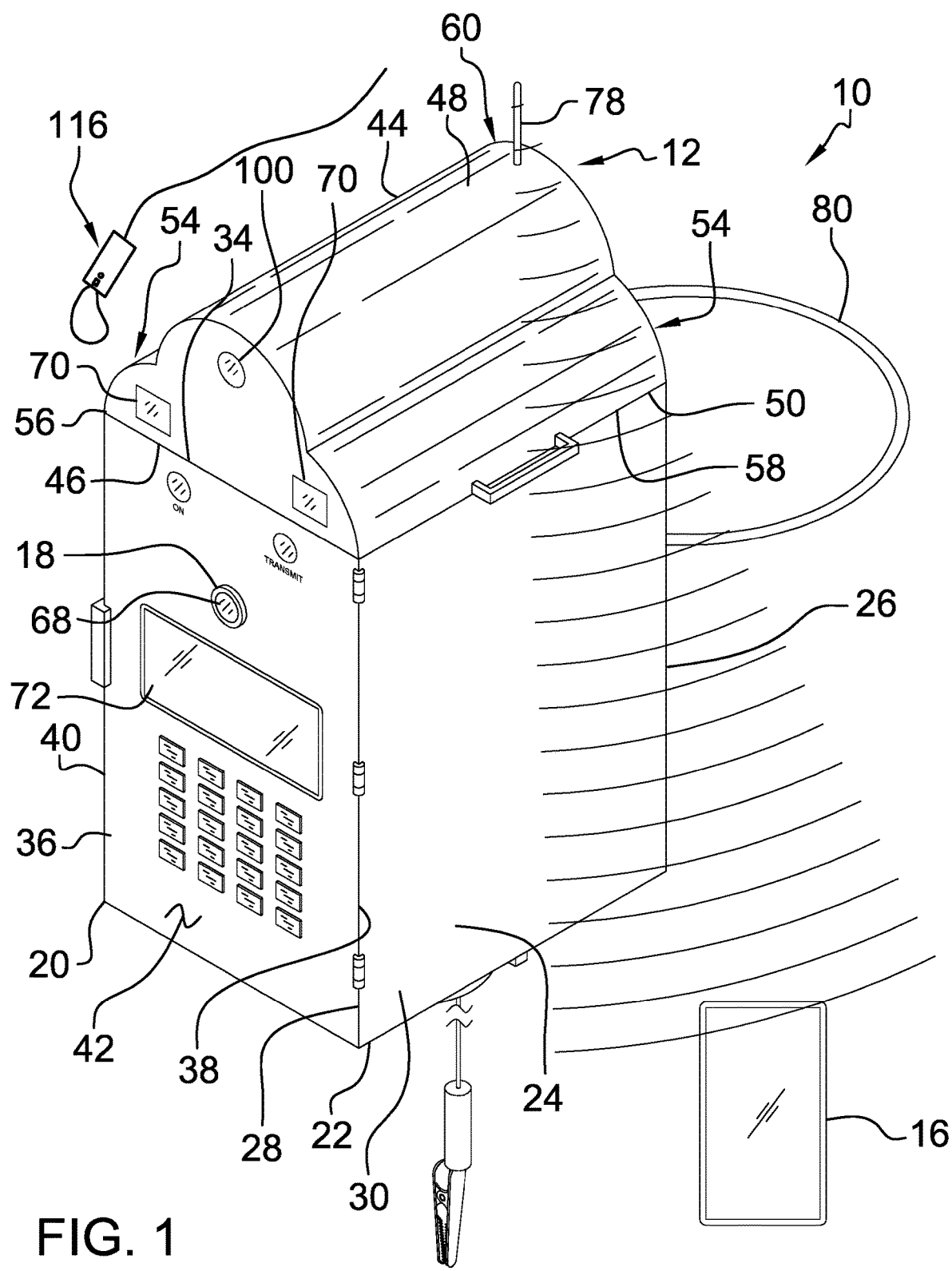
FIG. 1 is a front perspective view of an automated snare assembly according to an embodiment of the disclosure.
Figure 4:
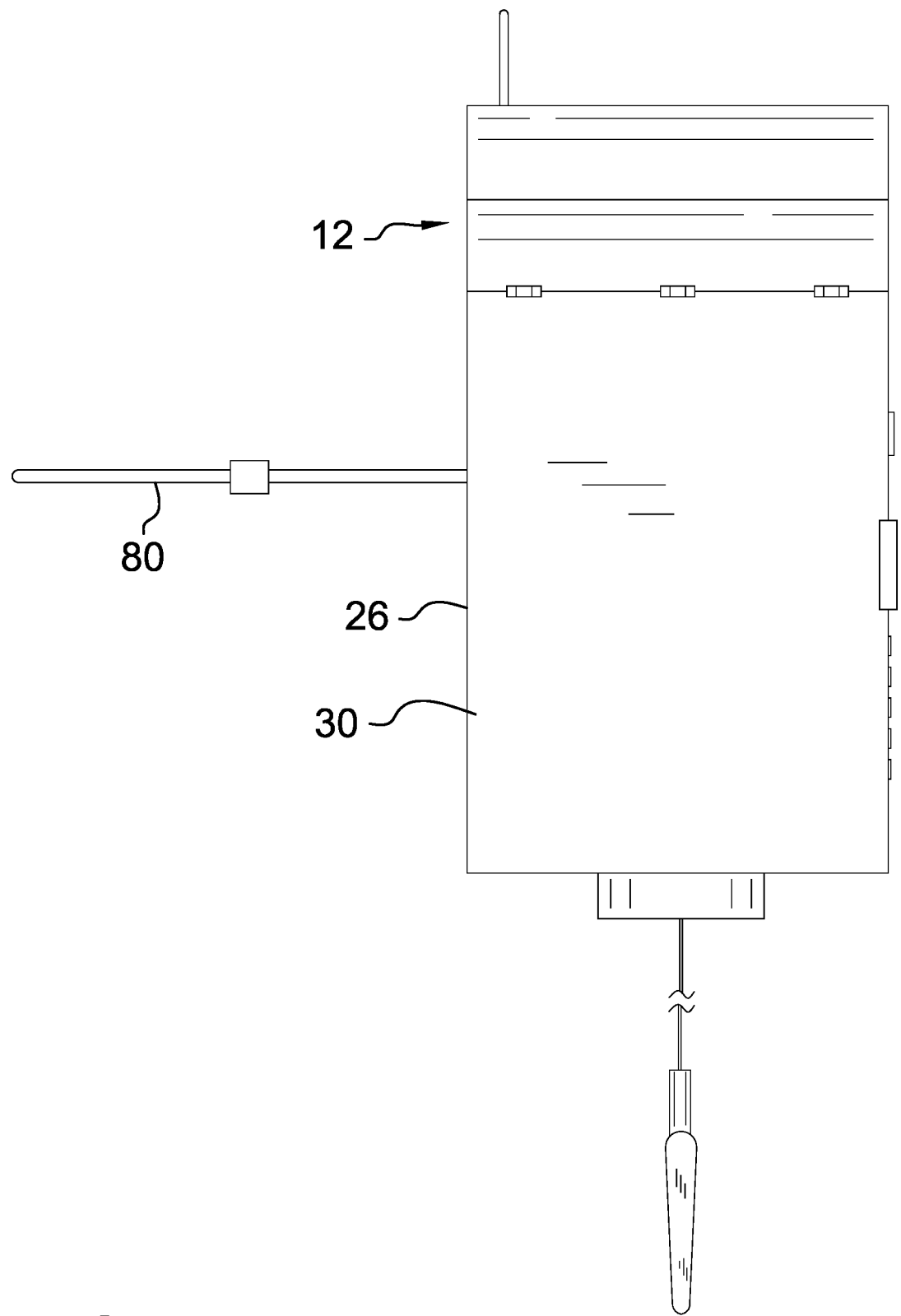
FIG. 4 is a right side view of a monitoring unit of an embodiment of the disclosure.
Figure 5:
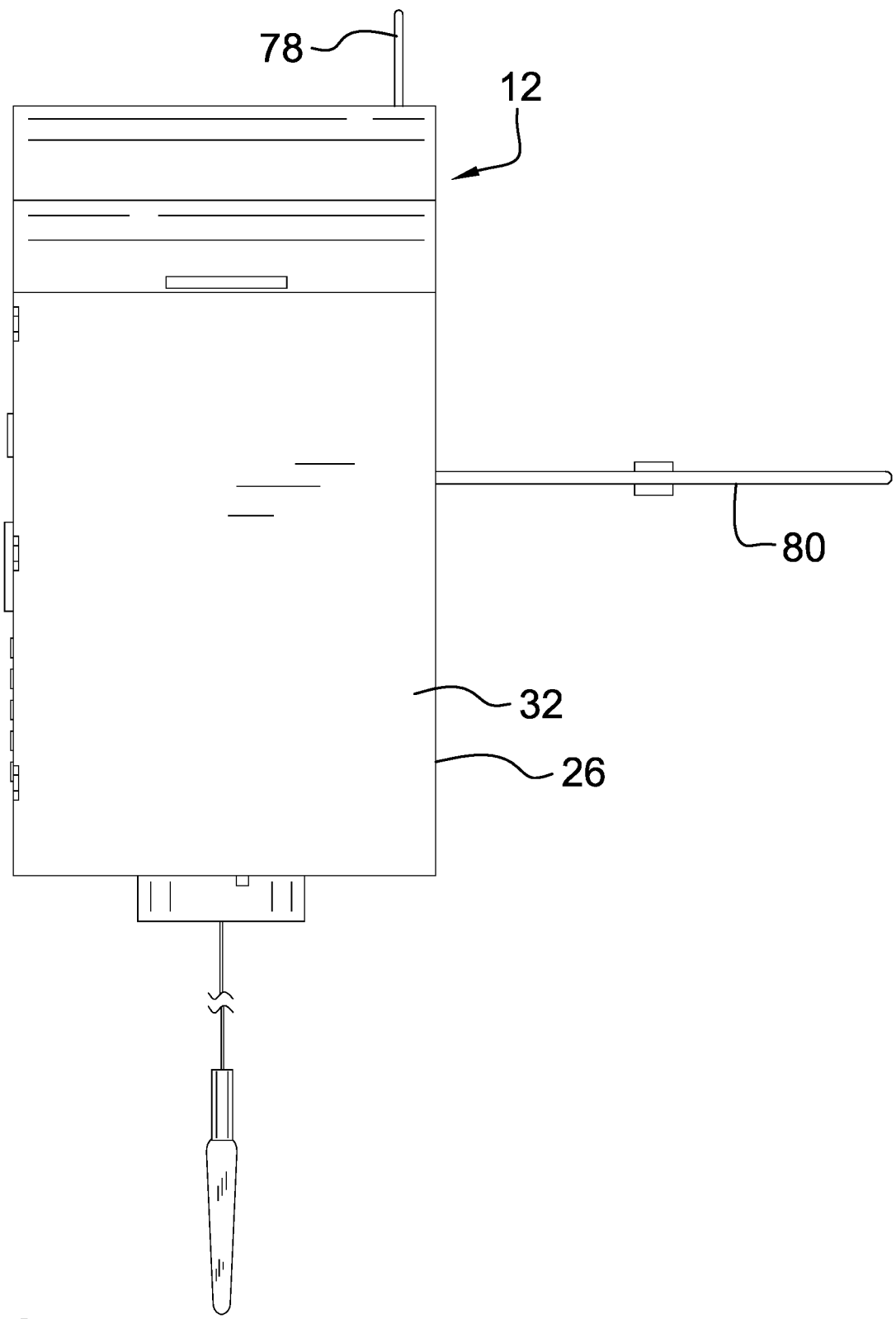
FIG. 5 is a left side view of a monitoring unit of an embodiment of the disclosure.
Figure 6:
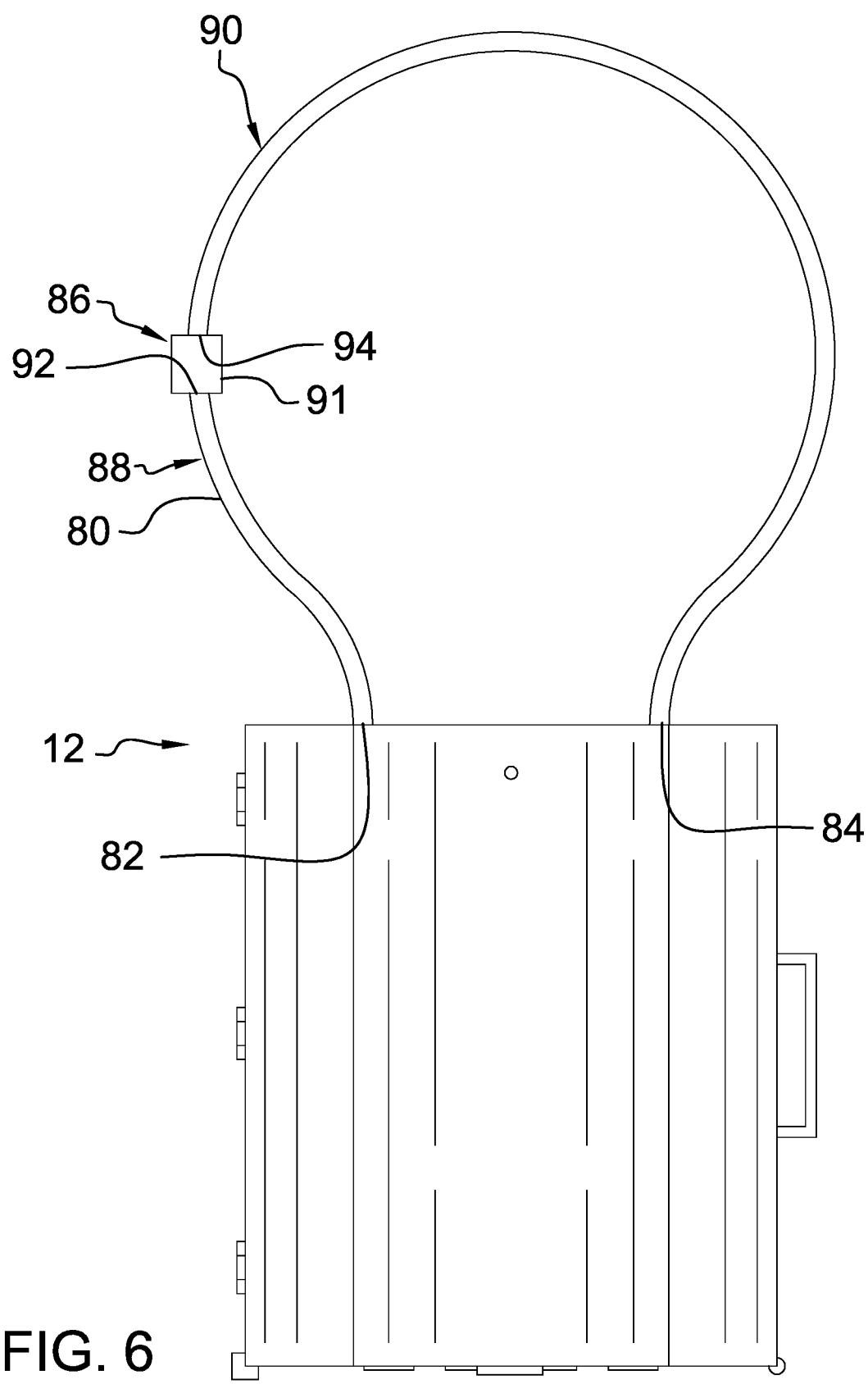
FIG. 6 is a top view of a monitoring unit of an embodiment of the disclosure.
Figure 7:
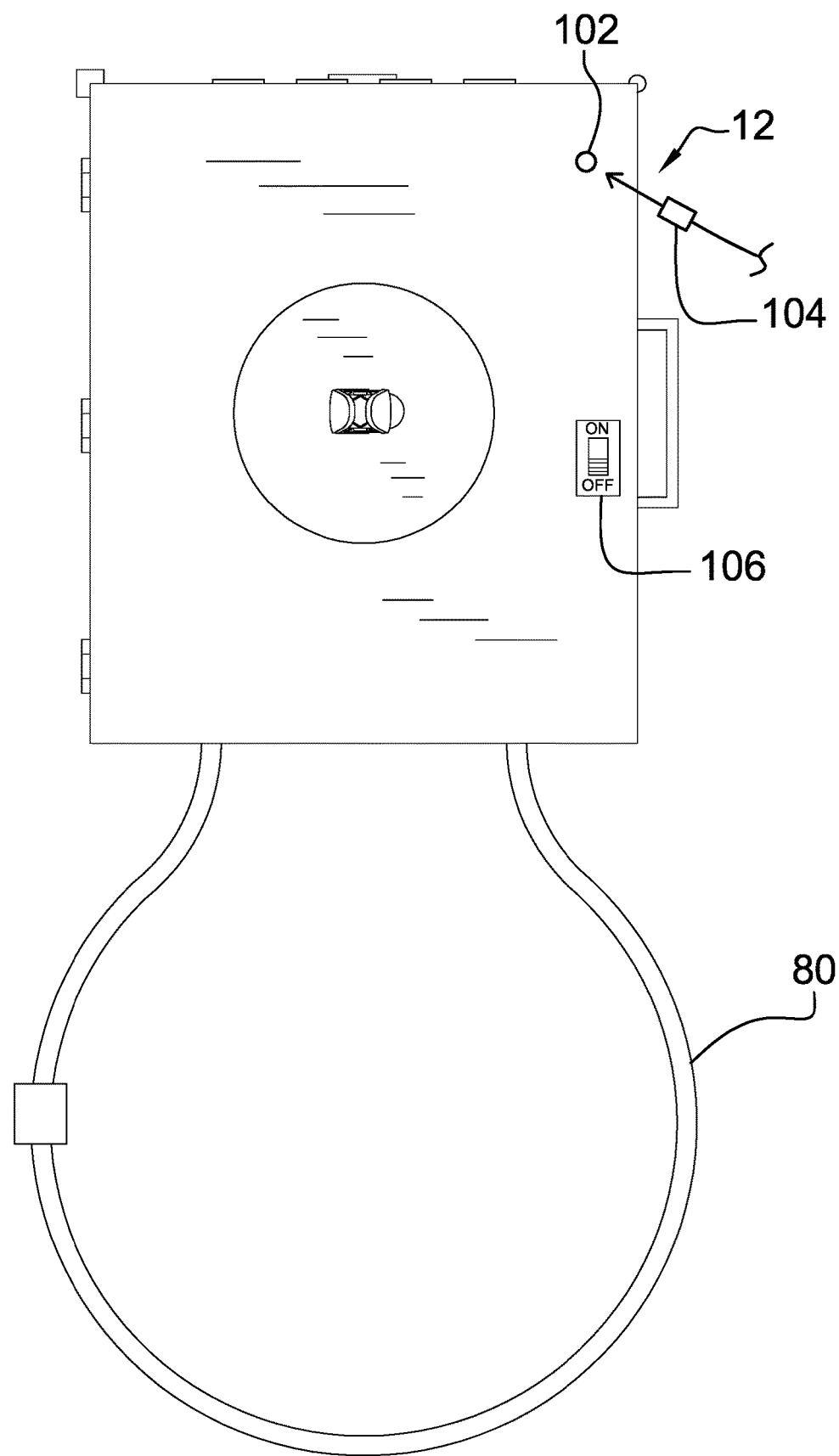
FIG. 7 is a bottom view of monitoring unit of an embodiment of the disclosure.
Figure 8:
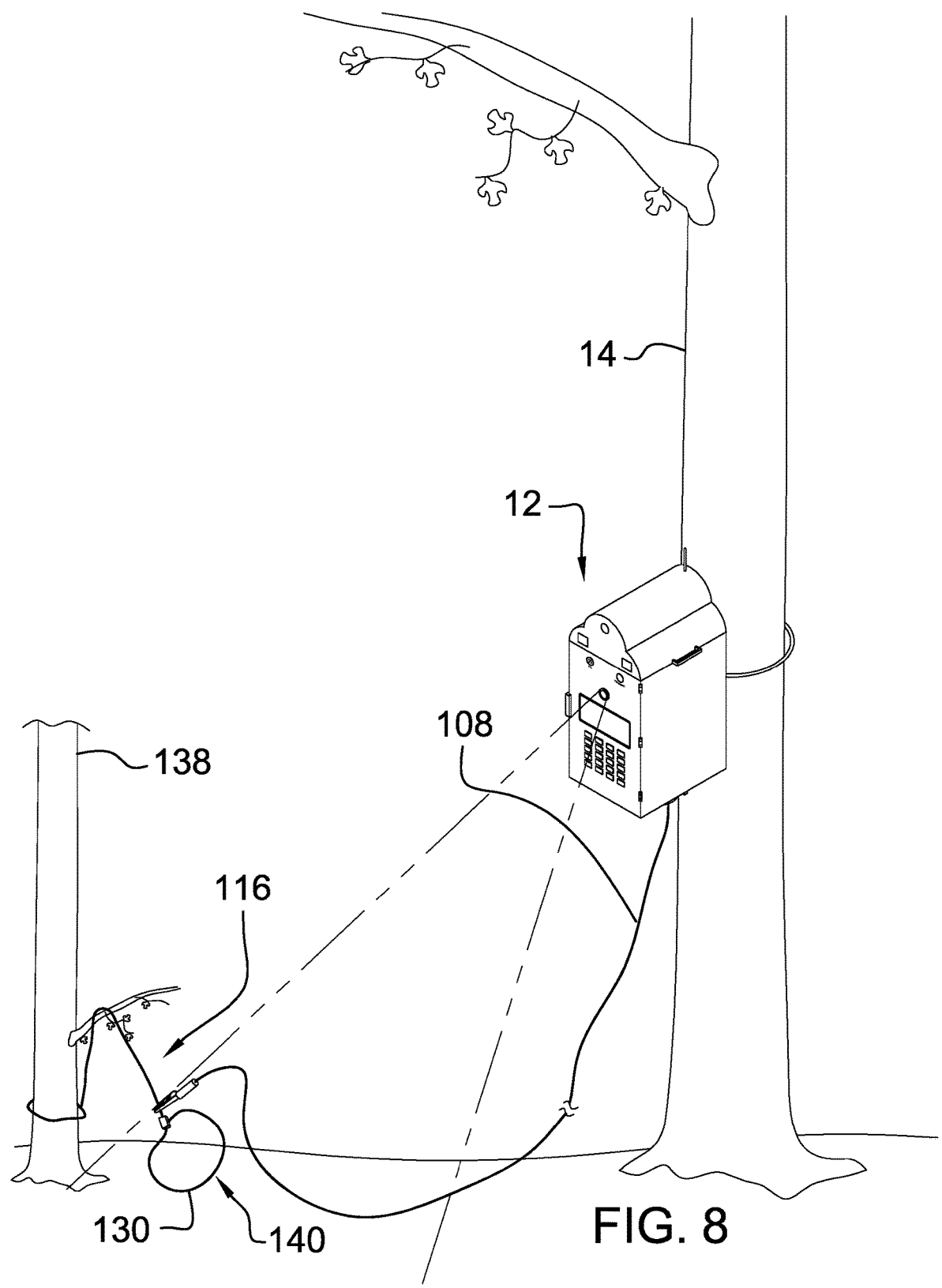
FIG. 8 is a perspective in-use view of an embodiment of the disclosure.
Figure 9:
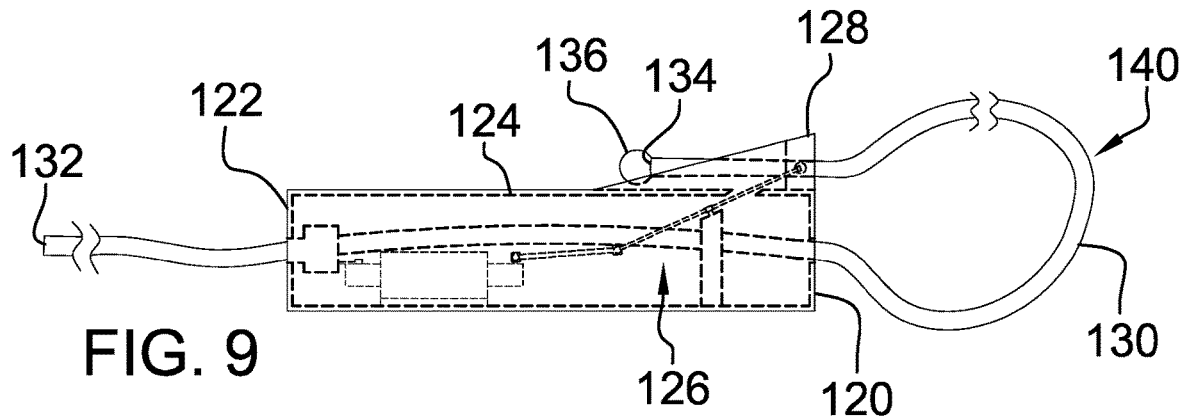
FIG. 9 is a right side phantom view of a snare unit of an embodiment of the disclosure.
Figure 10:
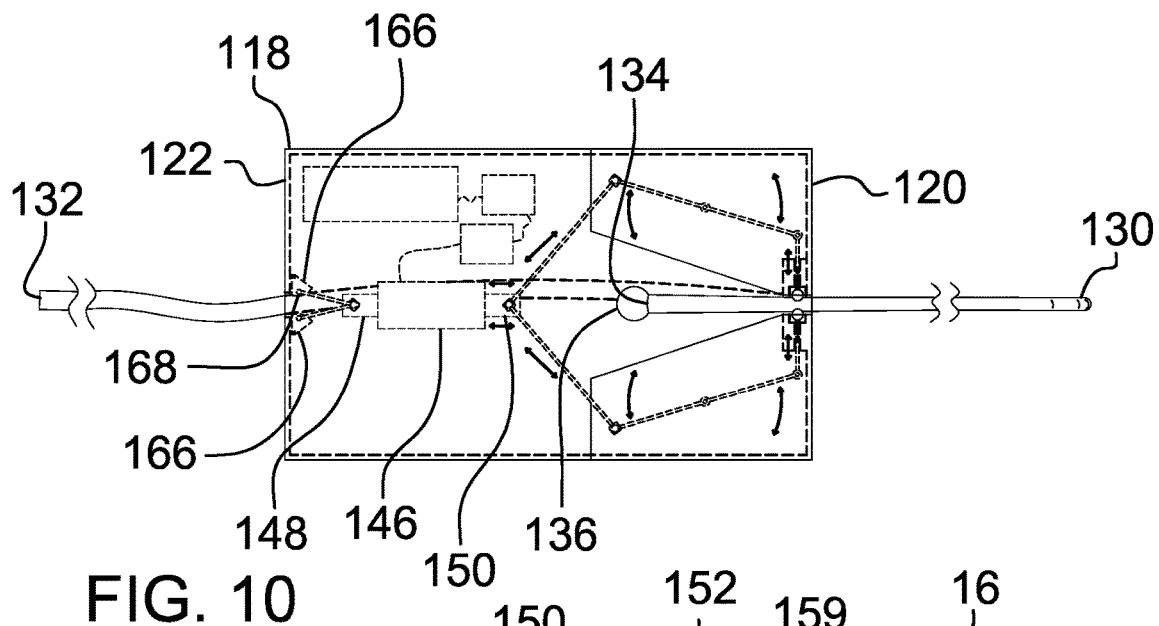
FIG. 10 is a top phantom view of a snare unit of an embodiment of the disclosure showing a solenoid in a first condition.
Figure 11:
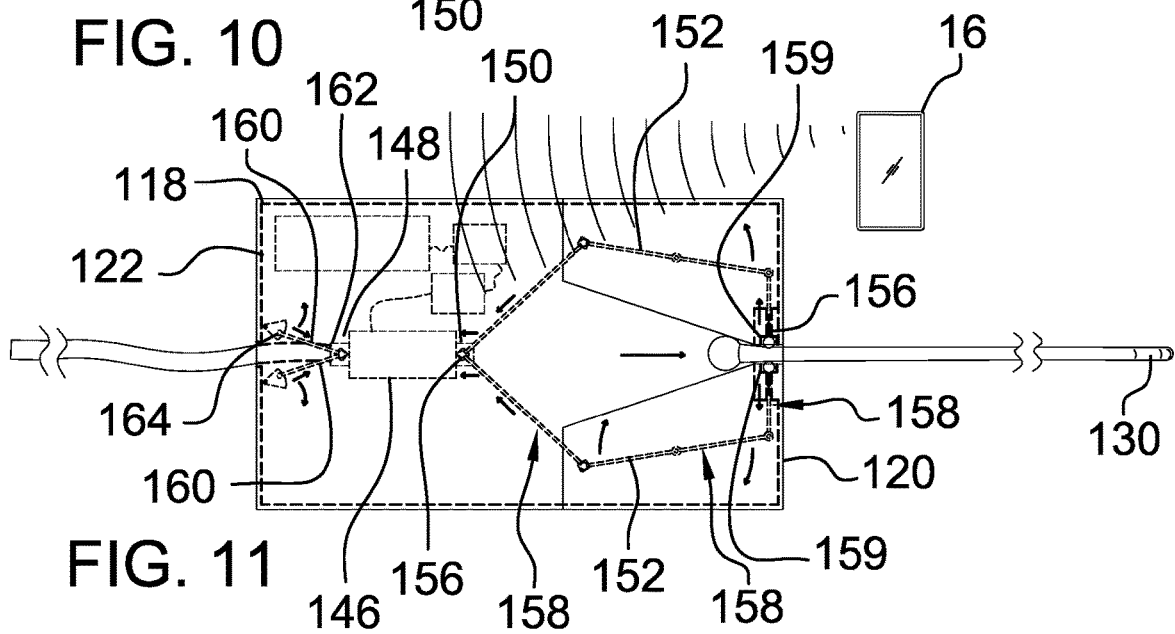
FIG. 11 is a top phantom view of a snare unit of an embodiment of the disclosure showing a solenoid in a second condition.
Figure 12:
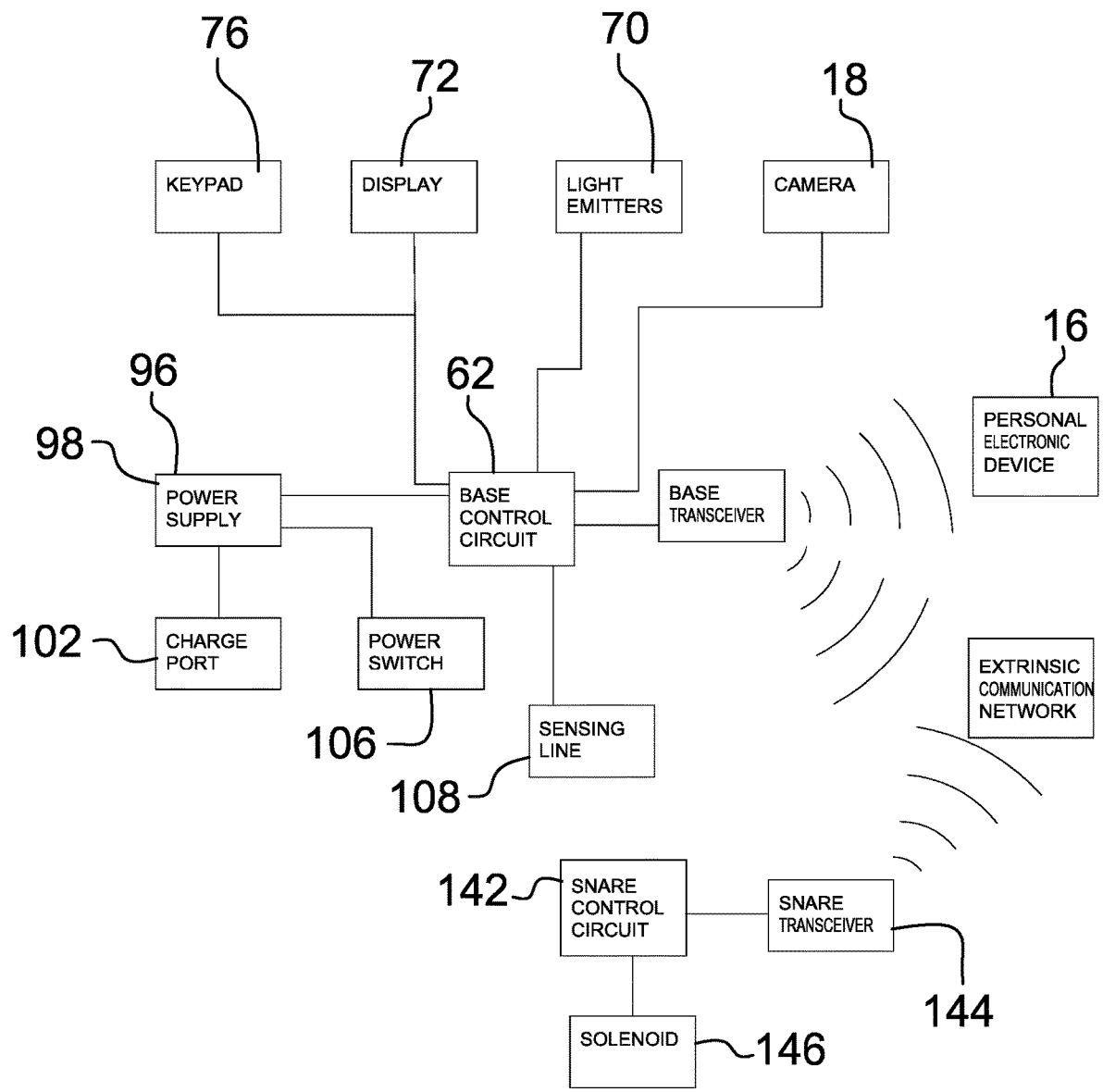
FIG. 12 is a schematic view of an embodiment of the disclosure.

With reference now to the drawings, and in particular to FIGS. 1 through 12 thereof, a new snare device embodying the principles and concepts of an embodiment of the disclosure and generally designated by the reference numeral 10 will be described.

As best illustrated in FIGS. 1 through 12, the automated snare assembly 10 generally comprises a monitoring unit 12 that is mountable to a tree 14 or other stanchion that is positioned outdoors. Additionally, the monitoring unit 12 can be positioned in an area that a fur trapper would set traps for trapping game. The monitoring unit 12 is in wireless communication with a personal electronic device 16, such as a smart phone or other type of electronic device that has wireless communication and a display. The monitoring unit 12 includes a camera 18 for providing imagery of a selected area proximate the tree 14 to the personal electronic device 16. In this way a user can continuously monitor the selected area if they so choose.

The monitoring unit 12 comprises a housing 20 that has a bottom wall 22 and an outer wall 24 extending upwardly from the bottom wall 22, and the outer wall 24 has a rear side 26, a front side 28, a first lateral side 30, a second lateral side 32 and a top side 34. Additionally, each of the front side 28 and the top side 34 is open to access an interior of the housing 20. A first door 36 is provided that has a first lateral edge 38, a second lateral edge 40 and a front surface 42, and the first lateral edge 38 is hingedly coupled to the first lateral side 30 of the outer wall 24 of the housing 20 thereby facilitating the first door 36 to open or close the front side 28 of the housing 20. A second door 44 is provided that has a front wall 46, a top wall 48 and a bottom edge 50, and the top wall 48 has a plurality of lobes 52 each curving upwardly with respect to the bottom edge 50. The plurality of lobes 52 include a pair of lateral lobes 54 each extending along a respective first sidelong side 56 and a second sidelong side 58 of the bottom edge 50. Additionally, the plurality of lobes 52 includes a central lobe 60 positioned between the pair of lateral lobes 54 such that the central lobe 60 extends upwardly from the pair of lateral lobes 54. The second sidelong side 58 of the bottom edge 50 is hingedly coupled to an intersection between the first lateral side 30 of the outer wall 24 of the housing 20 and the top side 34 of the housing 20 thereby facilitating the second door 44 to open and close the top side 34 of the housing 20.

The monitoring unit 12 includes a base control circuit 62 that is integrated into the housing 20 and the base control circuit 62 receives an alert input. A base transceiver 64 is integrated into the housing 20, the base transceiver 64 is electrically coupled to the base control circuit 62 and the base transceiver 64 is in wireless communication with the personal electronic device 16. Furthermore, the base transceiver 64 broadcasts an alert signal when the base control circuit 62 receives the alert input. The base transceiver 64 may comprise a radio frequency transceiver or the like and the base transceiver 64 may be in wireless communication with an extrinsic communication network 66, including but not being limited to, a cellular phone network. In this way the base transceiver 64 can communication with the personal electronic device 16 over a nearly unlimited distance.

The camera 18 is positioned on the front surface 42 of the first door 36 and the camera 18 is electrically coupled to the control circuit. The camera 18 includes a lens 68 extending forwardly from the front surface 42 and the camera 18 is turned on when the base control circuit 62 receives the alert input to capture imagery of a moving object, such as an animal. The camera 18 may comprise a digital video camera 18 or other similar type of image capturing device. A pair of light emitters 70 is each integrated into the front wall 46 of the second door 44 to emit light outwardly from the housing 20. Each of the light emitters 70 is electrically coupled to the base control circuit 62 and each of the light emitters 70 is turned on when the base control circuit 62 receives the alert input. In this way each of the light emitters 70 can illuminate an object being photographed by the camera 18. The object might be an animal that has walked near the monitoring unit 12 and each of the light emitters 70 may comprise a light emitting diode or other type of electronic light emitter.

A display 72 is integrated into the front surface 42 of the first door 36 and the display 72 is electrically coupled to the base control circuit 62. The display 72 display s indicia 74 comprising letters and numbers for communication operational parameters of the control circuit. The display 72 may comprise a liquid crystal display or other type of electronic display. A keypad 76 is integrated into the front surface 42 of the first door 36 thereby facilitating the keypad 76 to be manipulated and the keypad 76 is electrically coupled to the base control circuit 62. The keypad 76 comprises a plurality of alphanumeric keys for programming operational parameters into the control circuit.

The monitoring unit 12 includes an antenna 78 that is coupled to and extends upwardly from the central lobe 60 of the second door 44. The antenna 78 is electrically coupled to the base transceiver 64 for broadcasting a signal from the base transceiver 64. The monitoring unit 12 includes a cable 80 that has a first end 82 and a second end 84, and each of the first end 82 and the second end 84 is coupled to the rear side 26 of the outer wall 24 of the housing 20 such that the cable 80 forms a closed loop. In this way the cable 80 can be extended around the tree 14 for suspending the housing 20 on the tree 14. Additionally, the cable 80 has a break 86 integrated into the cable 80 to define a first portion 88 of the cable 80 and a second portion 90 of the cable 80. A cable coupler 91 is attached to a free end 92 of the first portion 88 of the cable 80 and the cable coupler 91 releasably engages a free end 94 of the second portion 90 of the cable 80 thereby facilitating the cable 80 to be routed around the tree 14. The cable coupler 91 may be a magnetic coupler, a mechanical coupler such as a clasp, or any other type of coupler that is capable of joining the first portion and the second portion together to form a closed loop.

The monitoring unit 12 includes a power supply 96 that is integrated into the housing 20 and the power supply 96 is electrically coupled to the base control circuit 62. The power supply 96 comprises a battery 98 that is positioned within the housing 20 and the battery 98 is electrically coupled to the base control circuit 62. The power supply 96 includes a charge indicator 100 integrated into the front wall 46 of the second door 44 and the charge indicator 100 is electrically coupled to the battery 98. The charge indicator 100 is turned on when a charge level of the battery 98 falls below a pre-determined minimum level of charge. In this way the charge indicator 100 can communicate that the battery 98 needs to be charged.

The power supply 96 includes a charge port 102 is recessed into the housing 20 to insertably receive a charge cord 104 from a charger. The charge port 102 is electrically coupled to the battery 98 for charging the battery 98. The power supply 96 includes a power switch 106 that is movably integrated into the bottom wall 22 of the housing 20. The power switch 106 is electrically coupled to the base control circuit 62 and the power switch 106 is positionable between an on position and an off position for turning the base control circuit 62 on and off. A sensing line 108 is coupled to and extends away from the bottom wall 22 of the housing 20 of the monitoring unit 12. The sensing line 108 is electrically coupled to the base control circuit 62 and the sensing line 108 has a distal end 110 with respect to the bottom wall 22. A clip 112 is coupled to the distal end 110 of the sensing line 108. The clip 112 has a pair of jaws 114 that are biased together and the jaws 114 are urgeable apart from each other.

A snare unit 116 is provided and the snare unit 116 is positionable in an area for snaring an animal. The snare unit 116 is positionable in a ready condition to snare the animal and the snare unit 116 is in wireless communication with the personal electronic device 16. The snare unit 116 is actuatable into a releasing condition by the personal electronic device 16 to release the animal that is snared. The snare unit 116 comprises a snare housing 118 that has a front end 120, a back end 122 and a top wall 124 extending between the front end 120 and the back end 122. The snare housing 118 has a channel 126 extending through the front end 120 and the back end 122. The snare housing 118 has a stop 128 extending upwardly from the top wall 48, and the stop 128 is aligned with the front end 120.

The snare unit 116 includes a snare 130 that has a first end 132 and a second end 134, and the snare 130 extends through the channel 126 in the snare housing 118. The snare 130 extends through the stop 128 such that the snare 130 forms a closed loop between the front end 120 of the snare housing 118 and the stop 128. In this way the closed loop facilitates a leg of an animal to extend through the closed loop. The animal may be a rabbit, a beaver, a mink or any other animal that is commonly trapped for the value of their pelt. The snare 130 passes in a first direction through the snare housing 118 such that a diameter of the closed loop is reduced to close around the leg of the animal.

The clip 112 on the sensing line 108 is attachable to the snare 130 thereby facilitating the sensing line 108 to sense movement in the snare 130. Furthermore, the base control circuit 62 receives the alert input when the sensing line 108 senses movement in the snare 130. A ball 136 is attached to the second end 134 of the snare 130 thereby inhibiting the second end 134 of the snare 130 from being drawn through the stop 128. The snare 130 is extendable around a stationary object 138, such as an adjacent tree or other immovable object, having the first end 132 of the snare 130 being secured to the snare 130. In this way the snare housing 118 can slide along the snare 130 when the animal leg tugs on the snare loop 140 for closing the snare loop 140 around the animal's leg.

The snare unit 116 includes a snare control circuit 142 that is positioned within the snare housing 118. The snare control circuit 142 receives a release input and the snare control circuit 142 receives a reset input. The snare unit 116 includes a snare transceiver 144 that is positioned within the snare housing 118 and the snare transceiver 144 is electrically coupled to the snare control circuit 142. The snare transceiver 144 is in wireless communication with the personal electronic device 16 and the snare control circuit 142 receives the release input when the snare transceiver 144 receives a release command from the personal electronic device 16. Furthermore, the snare control circuit 142 receives the reset input when the snare transceiver 144 receives a reset command from the personal electronic device 16.

The snare unit 116 includes a solenoid 146 that is positioned within the snare housing 118 and the solenoid 146 is electrically coupled to the snare control circuit 142. The solenoid 146 has a first actuator 148 and a second actuator 150; the first actuator 148 is directed toward the back end 122 of the snare housing 118 and the second actuator 150 is directed toward the front end 120 of the snare housing 118. The solenoid 146 is normally actuated into a first condition and the solenoid 146 is actuated into the first condition when the snare control circuit 142 receives the reset input. The solenoid 146 is actuated into a second condition when the snare control circuit 142 receives the release input. Each of the first actuator 148 and the second actuator 150 is extended outwardly from the solenoid 146 when the solenoid 146 is actuated into the first condition. Conversely, each of the first actuator 148 and the second actuator 150 is retracted inwardly on the solenoid 146 when the solenoid 146 is actuated into the second condition. The solenoid 146 may comprise a two direction electronic solenoid 146 or other similar type of twin pole, linear actuator.

The snare unit 116 includes a set of first arms 152 that each has a first end 154 and a second end 156, and each of the first arms 152 comprises a plurality of sections 158 that are pivotally attached together. The first end 154 of each of the first arms 152 is pivotally attached to the second actuator 150 in the solenoid 146 and each of the first arms 152 extends outwardly through the top wall 124 of the snare housing 118 at a point located adjacent to the stop 128. The second end 156 of each of the first arms 152 is directed toward each other. The second end 156 of each of the first arms 152 is compressed against the snare 130 between the stop 128 and the second end 84 of the snare 130 when the solenoid 146 is actuated into the first condition to inhibit the snare 130 from sliding between the first arms 152. Conversely, the second end 156 of each of the first arms 152 is spaced away from the snare 130 when the solenoid 146 is actuated into the second condition for facilitating the snare 130 to slide between the first arms 152. A pair of knobs 159 is each coupled to the second end 156 of each of the first arms 152 such that each of the knobs 159 engages the snare 130 when the solenoid 146 is actuated into the first condition.

The snare unit 116 includes a pair of second arms 160 that each has a primary end 162 and a secondary end 164, and the primary end 162 of each of the second arms 160 is pivotally coupled to the first actuator 148 in the solenoid 146. The snare unit 116 includes a pair of engagements 166 that is each pivotally coupled to the back end 122 of the snare housing 118 such that each of the engagements 166 is positioned inside of the snare housing 118. Each of the engagements 166 is positioned on opposing sides of the channel 126 in the snare housing 118 and the secondary end 164 of each of the second arms 160 is pivotally coupled to a respective one of the engagements 166.

Each of the engagements 166 has an engaging surface 168 that is textured with a saw tooth pattern. The saw tooth pattern is oriented to angle toward the back end 122 of the snare housing 118 and each of the engagements 166 is pivoted to compress the engaging surface 168 against the snare 130 when the solenoid 146 is actuated into the first condition. Each of the engagements 166 is displaced from the snare 130 when the solenoid 146 is actuated into the second condition. The saw tooth pattern facilitates the snare 130 to move in the first direction through the snare housing 118 when the engagements 166 are compressed against the snare 130 thereby facilitating the snare 130 to be tightened around the animal's leg. Conversely, the saw tooth pattern inhibits the snare 130 from moving in the second direction when the engagements 166 are compressed against the snare 130 thereby inhibiting the snare 130 from loosening around the animal's leg. The snare 130 is movable in either the first direction or the second direction when the engagements 166 are displaced from the snare 130.

In use, the monitoring unit 12 is positioned at a desired location and the snare unit 116 is set up in a location for snaring the animal. Additionally, the clip 112 on the sensing line 108 is attached to the snare 130. The camera 18 is turned on to capture imagery of the snare 130 and the base transceiver 64 broadcasts an alert the personal electronic device 16 to facilitate the user to view the imagery captured by the camera 18. In this way the user can remotely view an animal that has been snared in the snare unit 116. The user can employ the personal electronic device 16 to remotely actuate the snare unit 116 into the releasing condition in the event that the animal in the snare 130 is not an animal the user wishes to snare. In this way the animal in the snare 130 can escape the snare 130 unharmed. Furthermore, the user can travel to the snare unit 116 when the animal caught in the snare 130 is an animal that the user wishes to snare. The user must travel to the snare unit 116 to reset the snare 130 for snaring an animal when the snare unit 116 is actuated into the releasing condition or when the user retrieves the animal that has been snared in the snare 130.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated snare assembly for facilitating a snared animal to be remotely released when the snared animal is not the intended prey, said assembly comprising:
    a monitoring unit being mountable to a tree, said monitoring unit being in wireless communication with a personal electronic device, said monitoring unit including a camera for providing imagery of a selected area proximate the tree; and
    a snare unit being positionable in an area for snaring an animal and the selected area, said snare unit being positionable in a ready condition wherein said snare unit is configured to snare the animal, said snare unit being in wireless communication with the personal electronic device, said snare unit being actuatable into a releasing condition by the personal electronic device wherein said snare unit is configured to release the animal that is snared; and
    a sensing line coupled to and extending away from said monitoring unit, said sensing line being electrically coupled to a base control circuit of said monitoring unit, said sensing line having a distal end comprising a clip having a pair of jaws being biased together, said clip being attachable to said snare thereby facilitating said sensing line to sense movement in said snare, said base control circuit receiving an input when said sensing line senses movement in said snare.

2. The assembly according to claim 1, wherein said monitoring unit comprises:
    a housing having a bottom wall and an outer wall extending upwardly from said bottom wall, said outer wall having a rear side, a front side, a first lateral side, a second lateral side and a top side, each of said front side and said top side being open to access an interior of said housing;
    a first door having a first lateral edge, a second lateral edge and a front surface, said first lateral edge being hingedly coupled to said first lateral side of said outer wall of said housing thereby facilitating said first door to open or close said front side of said housing; and
    a second door having a front wall, a top wall and a bottom edge, said top wall having a plurality of lobes each curving upwardly with respect to said bottom edge, said plurality of lobes including a pair of lateral lobes each extending along a respective first sidelong side and a second sidelong side of said bottom edge, said plurality of lobes including a central lobe being positioned between said pair of lateral lobes such that said central lobe extends upwardly from said pair of lateral lobes, said second sidelong side of said bottom edge being hingedly coupled to an intersection between said first lateral side of said outer wall of said housing and said top side of said housing thereby facilitating said second door to open and close said top side of said housing.

3. The assembly according to claim 2, wherein said monitoring unit comprises:
    a base control circuit being integrated into said housing, said base control circuit receiving an alert input;
    a base transceiver being integrated into said housing, said base transceiver being electrically coupled to said base control circuit, said base transceiver being in wireless communication with the personal electronic device, said base transceiver broadcasting an alert signal when said base control circuit receives said alert input; and
    wherein said camera is positioned on said front surface of said first door, said camera being electrically coupled to said base control circuit, said camera including a lens extending forwardly from said front surface, said camera being turned on when said base control circuit receives said alert input to capture imagery of a moving object.

4. The assembly according to claim 3, wherein said monitoring unit comprises a pair of light emitters, each of said light emitters being integrated into said front wall of said second door wherein each of said light emitters is configured to emit light outwardly from said housing, each of said light emitters being electrically coupled to said base control circuit, each of said light emitters being turned on when said base control circuit receives said alert input wherein each of said light emitters is configured to illuminate an object being photographed by said camera.

5. The assembly according to claim 3, wherein said monitoring unit includes:
    a display being integrated into said front surface of said first door, said display being electrically coupled to said base control circuit, said display displaying indicia comprising letters and numbers for communication operational parameters of said control circuit;
    a keypad being integrated into said front surface of said first door thereby facilitating said keypad to be manipulated, said keypad being electrically coupled to said base control circuit, said keypad comprising a plurality of alphanumeric keys for programming operational parameters into said control circuit; and an antenna being coupled to and extending upwardly from said central lobe of said second door, said antenna being electrically coupled to said base transceiver for broadcasting a signal from said base transceiver.

6. The assembly according to claim 2, wherein said monitoring unit includes:
a cable having a first end and a second end, each of said first end and said second end being coupled to said rear side of said outer wall of said housing such that said cable forms a closed loop wherein said cable is configured to be extended around the tree for suspending said housing on the tree, said cable having a break integrated into said cable to define a first portion of said cable and a second portion of said cable; and
a cable coupler being attached to a free end of said first portion of said cable, said cable coupler releasably engaging a free end of said second portion of said cable thereby facilitating said cable to be routed around the tree.

7. The assembly according to claim 3, wherein said monitoring unit includes:
a power supply being integrated into said housing, said power supply being electrically coupled to said base control circuit, said power supply comprising:
a battery being positioned within said housing, said battery being electrically coupled to said base control circuit;
a charge indicator being integrated into said front wall of said second door, said charge indicator being electrically coupled to said battery, said charge indicator being turned on when a charge level of said battery falls below a pre-determined minimum level of charge wherein said charge indicator is configured to communicate that said battery needs to be charged;
a charge port being recessed into said housing wherein said charge port is configured to insertably receive a charge cord from a charger, said charge port being electrically coupled to said battery for charging said battery; and
a power switch being movably integrated into said bottom wall of said housing, said power switch being electrically coupled to said control circuit, said power switch being positionable between an on position and an off position for turning said control circuit on and off.

8. The assembly according to claim 1, wherein said snare unit comprises:
a snare housing having a front end, a back end and a top wall extending between said front end and said back end, said snare housing having a channel extending through said front end and said back end, said snare housing having a stop extending upwardly from said top wall, said stop being aligned with said front end; and
a snare having a first end and a second end, said snare extending through said channel in said snare housing, said snare extending through said stop such that said snare forms a closed loop between said front end of said snare housing and said stop wherein said closed loop is configured to facilitate a leg of an animal to extend through said closed loop.

9. The assembly according to claim 8, wherein:
said snare passes in a first direction through said snare housing such that a diameter of said closed loop is reduced wherein said closed loop is configured to close around the leg of the animal;

said snare having a ball being attached to said second end of said snare thereby inhibiting said second end from being drawn through said stop; and
said snare being extendable around a stationary object having said first end being secured to said snare thereby facilitating said snare housing to slide along said snare when the animal leg tugs on said snare loop for closing said snare loop around the animal's leg.

10. The assembly according to claim 8, wherein said snare unit includes:
a snare control circuit being positioned within said snare housing, said snare control circuit receiving a release input, said snare control circuit receiving a reset input; and
a snare transceiver being positioned within said snare housing, said snare transceiver being electrically coupled to said snare control circuit, said snare transceiver being in wireless communication with the personal electronic device, said snare control circuit receiving said release input when said snare transceiver receives a release command from the personal electronic device, said snare control circuit receiving said reset input when said snare transceiver receives a reset command from the personal electronic device.

11. The assembly according to claim 10, wherein:
said snare unit includes a solenoid being positioned within said snare housing, said solenoid being electrically coupled to said snare control circuit, said solenoid having a first actuator and a second actuator, said first actuator being directed toward said back end of said snare housing, said second actuator being directed toward said front end of said snare housing, said solenoid being normally actuated into a first condition;
said solenoid is actuated into said first condition when said snare control circuit receives said reset input;
said solenoid is actuated into a second condition when said snare control circuit receives said release input;
each of said first actuator and said second actuator is extended outwardly from said solenoid when said solenoid is actuated into said first condition; and
each of said first actuator and said second actuator is retracted inwardly on said solenoid when said solenoid is actuated into said second condition.

12. The assembly according to claim 11, wherein said snare unit includes a set of first arms, each of said first arms having a first end and a second end, each of said first arms comprising a plurality of sections being pivotally attached together, said first end of each of said first arms being pivotally attached to said second actuator in said solenoid, each of said first arms extending outwardly through said top wall of said snare housing at a point located adjacent to said stop, said second end of each of said first arms being directed toward each other.

13. The assembly according to claim 12, wherein said second end of each of said arms is compressed against said snare between said stop and said second end of said snare when said solenoid is actuated into said first condition for inhibiting said snare from sliding between said first arms, said second end of each of said first arms being spaced away from said snare when said solenoid is actuated into said second condition for facilitating said snare to slide between said first arms.

14. The assembly according to claim 13, further comprising a pair of knobs, each of said knobs being coupled to said second end of each of said first arms such that each of said knobs engages said snare when said solenoid is actuated into said first condition.

15. The assembly according to claim 12, wherein said snare unit includes:
- a pair of second arms, each of said second arms having a primary end and a secondary end, said primary end of each of said second arms being pivotally coupled to said first actuator in said solenoid; and
- a pair of engagements, each of said engagements being pivotally coupled to said back end of said snare housing such that each of said engagements is positioned inside of said snare housing, each of said engagements being positioned on opposing sides of said channel in said snare housing, said secondary end of each of said second arms being pivotally coupled to a respective one of said engagements.

16. The assembly according to claim 15, wherein:
- each of said engagements has an engaging surface being textured with a saw tooth pattern, said saw tooth pattern being oriented to angle toward said back end of said snare housing;
- each of said engagements is pivoted to compress said angled surface against said snare when said solenoid is actuated into said first condition;
- each of said engagements is displaced from said snare when said solenoid is actuated into said second condition;
- said saw tooth pattern facilitates said snare to move in said first direction through said snare housing when said engagements are compressed against said snare thereby facilitating said snare to be tightened around the animal's leg;
- said saw tooth pattern inhibits said snare from moving in said second direction when said engagements are compressed against said snare thereby inhibiting said snare from loosening around the animal's leg; and
- said snare is movable in either said first direction or said second direction when said engagements are displaced from said snare.

17. An automated snare assembly for facilitating a snared animal to be remotely released when the snared animal is not the intended prey, said assembly comprising:
- a monitoring unit being mountable to a tree, said monitoring unit being in wireless communication with a personal electronic device, said monitoring unit including a camera for providing imagery of a selected area proximate the tree, said monitoring unit comprising:
  - a housing having a bottom wall and an outer wall extending upwardly from said bottom wall, said outer wall having a rear side, a front side, a first lateral side, a second lateral side and a top side, each of said front side and said top side being open to access an interior of said housing;
  - a first door having a first lateral edge, a second lateral edge and a front surface, said first lateral edge being hingedly coupled to said first lateral side of said outer wall of said housing thereby facilitating said first door to open or close said front side of said housing;
  - a second door having a front wall, a top wall and a bottom edge, said top wall having a plurality of lobes each curving upwardly with respect to said bottom edge, said plurality of lobes including a pair of lateral lobes each extending along a respective first sidelong side and a second sidelong side of said bottom edge, said plurality of lobes including a central lobe being positioned between said pair of lateral lobes such that said central lobe extends upwardly from said pair of lateral lobes, said second sidelong side of said bottom edge being hingedly coupled to an intersection between said first lateral side of said outer wall of said housing and said top side of said housing thereby facilitating said second door to open and close said top side of said housing;
  - a base control circuit being integrated into said housing, said base control circuit receiving an alert input;
  - a base transceiver being integrated into said housing, said base transceiver being electrically coupled to said base control circuit, said base transceiver being in wireless communication with the personal electronic device, said base transceiver broadcasting an alert signal when said base control circuit receives said alert input;
  - wherein said camera is positioned on said front surface of said first door, said camera being electrically coupled to said control circuit, said camera including a lens extending forwardly from said front surface, camera being turned on when said base control circuit receives said alert input to capture imagery of a moving object;
  - a pair of light emitters, each of said light emitters being integrated into said front wall of said second door wherein each of said light emitters is configured to emit light outwardly from said housing, each of said light emitters being electrically coupled to said base control circuit, each of said light emitters being turned on when said base control circuit receives said alert input wherein each of said light emitters is configured to illuminate an object being photographed by said camera;
  - a display being integrated into said front surface of said first door, said display being electrically coupled to said base control circuit, said display displaying indicia comprising letters and numbers for communication operational parameters of said control circuit;
  - a keypad being integrated into said front surface of said first door thereby facilitating said keypad to be manipulated, said keypad being electrically coupled to said base control circuit, said keypad comprising a plurality of alphanumeric keys for programming operational parameters into said control circuit;
  - an antenna being coupled to and extending upwardly from said central lobe of said second door, said antenna being electrically coupled to said base transceiver for broadcasting a signal from said base transceiver;
  - a cable having a first end and a second end, each of said first end and said second end being coupled to said rear side of said outer wall of said housing such that said cable forms a closed loop wherein said cable is configured to be extended around the tree for suspending said housing on the tree, said cable having a break integrated into said cable to define a first portion of said cable and a second portion of said cable;
  - a cable coupler being attached to a free end of said first portion of said cable, said cable coupler releasably engaging a free end of said second portion of said cable thereby facilitating said cable to be routed around the tree;
  - a power supply being integrated into said housing, said power supply being electrically coupled to said base control circuit, said power supply comprising:

a battery being positioned within said housing, said battery being electrically coupled to said base control circuit;
a charge indicator being integrated into said front wall of said second door, said charge indicator being electrically coupled to said battery, said charge indicator being turned on when a charge level of said battery falls below a pre-determined minimum level of charge wherein said charge indicator is configured to communicate that said battery needs to be charged;
a charge port being recessed into said housing wherein said charge port is configured to insertably receive a charge cord from a charger, said charge port being electrically coupled to said battery for charging said battery; and
a power switch being movably integrated into said bottom wall of said housing, said power switch being electrically coupled to said control circuit, said power switch being positionable between an on position and an off position for turning said control circuit on and off;
a sensing line being coupled to and extending away from said bottom wall of said housing of said monitoring unit, said sensing line being electrically coupled to said base control circuit, said sensing line having a distal end with respect to said bottom wall;
a clip being coupled to said distal end of said sensing line, said clip having a pair of jaws being biased together, said jaws being urgeable apart from each other;
a snare unit being positionable in an area for snaring an animal, said snare unit being positionable in a ready condition wherein said snare unit is configured to snare the animal, said snare unit being in wireless communication with the personal electronic device, said snare unit being actuatable into a releasing condition by the personal electronic device wherein said snare unit is configured to release the animal that is snared, said snare unit comprising:
  a snare housing having a front end, a back end and a top wall extending between said front end and said back end, said snare housing having a channel extending through said front end and said back end, said snare housing having a stop extending upwardly from said top wall, said stop being aligned with said front end;
  a snare having a first end and a second end, said snare extending through said channel in said snare housing, said snare extending through said stop such that said snare forms a closed loop between said front end of said snare housing and said stop wherein said closed loop is configured to facilitate a leg of an animal to extend through said closed loop, said snare passing in a first direction through said snare housing such that a diameter of said closed loop is reduced wherein said closed loop is configured to close around the leg of the animal, said snare having a ball being attached to said second end of said snare thereby inhibiting said second end from being drawn through said stop, said snare being extendable around a stationary object having said first end being secured to said snare thereby facilitating said snare housing to slide along said snare when the animal leg tugs on said snare loop for closing said snare loop around the animal's leg, said clip on said sensing line being attachable to said snare thereby facilitating said sensing line to sense movement in said snare, said base control circuit receiving said alert input when said sensing line senses movement in said snare;
  a snare control circuit being positioned within said snare housing, said snare control circuit receiving a release input, said snare control circuit receiving a reset input;
  a snare transceiver being positioned within said snare housing, said snare transceiver being electrically coupled to said snare control circuit, said snare transceiver being in wireless communication with the personal electronic device, said snare control circuit receiving said release input when said snare transceiver receives a release command from the personal electronic device, said snare control circuit receiving said reset input when said snare transceiver receives a reset command from the personal electronic device;
  a solenoid being positioned within said snare housing, said solenoid being electrically coupled to said snare control circuit, said solenoid having a first actuator and a second actuator, said first actuator being directed toward said back end of said snare housing, said second actuator being directed toward said front end of said snare housing, said solenoid being normally actuated into a first condition, said solenoid being actuated into said first condition when said snare control circuit receives said reset input, said solenoid being actuated into a second condition when said snare control circuit receives said release input, each of said first actuator and said second actuator being extended outwardly from said solenoid when said solenoid is actuated into said first condition, each of said first actuator and said second actuator being retracted inwardly on said solenoid when said solenoid is actuated into said second condition;
  a set of first arms, each of said first arms having a first end and a second end, each of said first arms comprising a plurality of sections being pivotally attached together, said first end of each of said first arms being pivotally attached to said second actuator in said solenoid, each of said first arms extending outwardly through said top wall of said snare housing at a point located adjacent to said stop, said second end of each of said first arms being directed toward each other, said second end of each of said arms being compressed against said snare between said stop and said second end of said snare when said solenoid is actuated into said first condition for inhibiting said snare from sliding between said first arms, said second end of each of said first arms being spaced away from said snare when said solenoid is actuated into said second condition for facilitating said snare to slide between said first arms;
  a pair of knobs, each of said knobs being coupled to said second end of each of said first arms such that each of said knobs engages said snare when said solenoid is actuated into said first condition;
  a pair of second arms, each of said second arms having a primary end and a secondary end, said primary end of each of said second arms being pivotally coupled to said first actuator in said solenoid; and a pair of engagements, each of said engagements being pivotally coupled to said back end of said snare housing such that each of said engagements is positioned inside of said snare housing, each of said engagements being positioned on opposing sides of said channel in said snare housing, said secondary end of each of said second arms being pivotally coupled to a respective one of said engagements, each of said engagements having an engaging surface being textured with a saw tooth pattern, said saw tooth pattern being oriented to angle toward said back end of said snare housing, each of said engagements being pivoted to compress said angled surface against said snare when said solenoid is actuated into said first condition, each of said engagements being displaced from said snare when said solenoid is actuated into said second condition, said saw tooth pattern facilitating said snare to move in said first direction through said snare housing when said engagements are compressed against said snare thereby facilitating said snare to be tightened around the animal's leg, said saw tooth pattern inhibiting said snare from moving in said second direction when said engagements are compressed against said snare thereby inhibiting said snare from loosening around the animal's leg, said snare being movable in either said first direction or said second direction when said engagements are displaced from said snare.

* * * * *